United States Patent
Lee et al.

(10) Patent No.: US 8,427,174 B2
(45) Date of Patent: Apr. 23, 2013

(54) MEASUREMENT PROCESS FOR DETERMINATION OF THE OPTIMUM CONTACT PRESSURE AMONG COMPONENTS OF A SOLID OXIDE FUEL CELL STACK IN THE PACKAGING PROCESS AND ITS MEASUREMENT APPARATUS

(75) Inventors: Maw-Chwain Lee, Taoyuan County (TW); Wei-Xin Kao, Taoyuan County (TW); Tai-Nan Lin, Taoyuan County (TW); Szu-Han Wu, Taoyuan County (TW); Yung-Neng Cheng, Taoyuan County (TW); Yang-Chuang Chang, Taoyuan County (TW); Ruey-Yi Lee, Taoyuan County (TW); Chun-Hsiu Wang, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 355 days.

(21) Appl. No.: 12/874,307

(22) Filed: Sep. 2, 2010

(65) Prior Publication Data

US 2011/0221450 A1    Sep. 15, 2011

(30) Foreign Application Priority Data

Mar. 12, 2010    (TW) .............................. 99107308 A

(51) Int. Cl.
*G01R 27/00* (2006.01)
(52) U.S. Cl.
USPC ........................................... 324/600; 324/649
(58) Field of Classification Search .................. None
See application file for complete search history.

(56) References Cited

U.S. PATENT DOCUMENTS

2002/0129323 A1* 9/2002 Kasukabe et al. ............... 716/4

\* cited by examiner

*Primary Examiner* — Minh N Tang
(74) *Attorney, Agent, or Firm* — WPAT PC; Justin King

(57) ABSTRACT

The present invention provides a measurement process for determination of the optimum contact pressure among components of a solid oxide fuel cell stack in the packaging process in order that the reduction in performance caused by the packaging process can be reduced. The present invention also provides a measurement apparatus which can carry the measurement process out.

4 Claims, 8 Drawing Sheets

MEASUREMENT PROCESS FOR DETERMINATION OF THE OPTIMUM CONTACT PRESSURE AMONG COMPONENTS OF A SOLID OXIDE FUEL CELL STACK IN THE PACKAGING PROCESS AND ITS MEASUREMENT APPARATUS

FIELD OF THE INVENTION

The present invention pertains generally to the measuring process and apparatus of optimum contact pressure among components. More specifically, the present invention pertains to the measuring process and apparatus for determination of the optimum contact pressure among components of a solid oxide fuel cell stack in the packaging process.

BACKGROUND OF THE INVENTION

The solid oxide fuel cell, hereinafter referred as SOFC, has advantages of high conversion efficiency, low acoustic noise, low environment pollution, high reliability, fuel diversity, and potential of challenging the internal combustion engine especially at a time when the petroleum reserve is getting lower and lower, hydrogen energy is uprising for the future problem of energy shortage; SOFC becomes a key focus for a new energy source.

The main components of solid oxide fuel cell stack class, SOFC-Stack class, that are used in plate type solid oxide fuel cell, SOFC, includes: an electrolyte membrane, a cathode layer, a cathode current collector, an anode layer and an anode current collector, wherein, said electrolyte membrane is set between sides of a cathode layer and anode layer, so that, said electrolyte membrane, said cathode layer, and said anode layer constitute a unit of membrane electrode assembly, MEA, said cathode current collector is set on the other side of said cathode layer, and said anode current collector is set on the other side of said anode layer Presently, the key objectives of making MEA are high performance, high durability, high stability, and low degradation rate. The key conditions for reaching the above objectives are the materials and structure of MEA. When the materials and structure of MEA are changed, the characteristics of MEA will be changed accordingly.

As to the materials, the most commonly used electrolyte is ytteria-stabilized zirconium oxide, YSZ. Commonly used anode material is NiO-doped ytteria-stabilized zirconium oxide, NiO/YSZ, commonly used cathode material is strontium-doped $LaMnO_3$, LSM, or strontium- and ferrous-doped $LaCoO_3$, LSCF.

The cathode current collector is usually comprised of net or mesh made from Pt or Ni, the cathode current collector is mainly comprised of mesh made from Pt or Ag.

All research institutes in the world are endeavoring in the improving of materials development and technology in material treatment to reduce impedance, increase ionic conductivity, electrical conductivity, power density, and improving the performance efficiency of SOFC.

However, even said components constituted with good materials, still may not be enough to improve the efficiency of SOFC, and have to package the said components into SOFC-Stack class with superb efficiency, so that a plurality of SOFC-Stack class can be effectively connected by a series connection or parallel connection, thereinafter, fabricate a suitable SOFC power generation system, to satisfy the requirement for different voltage or current. Since the level of technology in packaging SOFC-Stack is high, not only tight sealing MEA into SOFC-Stack forming a separated anode chamber and cathode chamber, and tight sealing to become an independent closed system, to perform effective electrochemical reaction, ensuring an open circuit voltage higher than 1.0V, increasing the MEA life, on the other hand, let the cathode current collector and the anode current collector closely and completely contact the cathode and anode of MEA, effectively conduct the current produced by electrochemical reaction in MEA to improve electrical power efficiency. With these two basic requirements, on the one hand preventing power consumption caused by bad contact, on the other hand, avoiding damage to MEA components caused by too much contact pressure.

Therefore, a measurement process and measurement apparatus for determination of the optimum contact pressure among components of a solid oxide fuel cell stack in the packaging process is highly desirable, so that, the damage of components in packaging SOFC-Stack class can be reduced and the optimum electrical contact among components can be reached.

SUMMARY OF THE INVENTION

The present invention provides a measurement process for determination of the optimum contact pressure among components of a solid oxide fuel cell stack in the packaging process, the measuring process comprises the following steps:

Step 1: Put a MEA in the temperature of 650-800° C. to perform NiO reduction reaction on it, then maintain the reduction status while the temperature of MEA is brought down to room temperature;

Step 2: Apply contact pressure to the first electrode surface of said MEA with 2 detecting probes and record the value of the contact pressure applied, in the mean time, measure the impedance value between said 2 detecting probes, and make the first relation diagram of contact pressure to impedance on a rectangular coordinate system, then obtain the first optimum contact pressure from the first relation diagram;

Step 3: Apply contact pressure to the second electrode surface of said MEA with 2 detecting probes and record the value of the contact pressure applied, in the mean time, measure the impedance value between said 2 detecting probes, and make the second relation diagram of contact pressure to impedance on a rectangular coordinate system, then obtain the second optimum contact pressure from the second relation diagram;

Step 4: Set a first electrode current collector on the first electrode surface of said MEA, and set a second electrode current collector on the second electrode surface of said MEA, made into a SOFC-Stack class;

Step 5: Apply contact pressure to the surface of the first electrode current collector on the first electrode surface of said SOFC-Stack class with 2 detecting probes and record the contact pressure applied, in the mean time, measure the impedance value between said 2 detecting probes under selected contact pressures, and make a third relation diagram of contact pressure to impedance on a rectangular coordinate system, then obtain a third optimum contact pressure from said third relation diagram; and Step 6: Apply contact pressure to the surface of the second electrode current collector on the second electrode surface of said SOFC-Stack class with 2 detecting probes and record the contact pressure applied, in the mean time, measure the impedance value between said 2 detecting probes under selected contact pressures, and make a fourth relation diagram of contact pressure to impedance on a rectangular coordinate system, then obtain a fourth optimum contact pressure from said fourth relation The present invention provides a measurement apparatus for determination of the optimum contact pressure among components of a solid oxide fuel cell stack in the packaging process, comprising the followings:
- a supporting platform, for placing under measurement component;
- an impedance measurement unit, for measuring impedance between two points, said impedance measurement unit at least includes:
  - two detecting probes, for contacting the positions of two measuring points to measure the impedance between said two measuring points; and
  - an impedance displaying unit, for displaying measured impedance between two points; and
- a pressure generating and measurement displaying unit, which at least includes:
  - a pressure generating unit, for generating pressure;
  - a pressure measurement displaying unit, for measuring and displaying the pressure produced by pressure generating unit;
  - a detecting probe fixation unit, for fixation of said two detecting probes, and for adjusting the distance between said two detecting probes; and
- a pressure transmitting unit, which is set between the pressure generating unit and the detecting probe fixation unit, for transmitting pressure generated from pressure generating unit to detecting probe fixation unit, so that, while measuring the impedance between two points on under measurement component, the detecting probes fixed on detecting probe fixation unit can apply pressure to said under measurement component.

DESCRIPTION OF THE EXEMPLARY EMBODIMENTS

Through the measurement process of the present invention, the optimum contact pressure among components of a solid oxide fuel cell stack can be measured. When the contact pressure exceeds the optimum contact pressure among components, not only does the impedance stops lowering down but also causes damaging effects of SOFC-stack components due to too much contact pressure. Therefore, applying the measurement process of the present invention will not only reduce the loss of damaging SOFC-stack components due to too much contact pressure, but also obtain the optimum electrical contact among components, so that the highest electrical conduction efficiency can be reached after the whole SOFC-Stack packaging process completed, and the electrical power produced by MEA operation can be transmitted to SOFC-Stack as much as possible.

Figure 2:
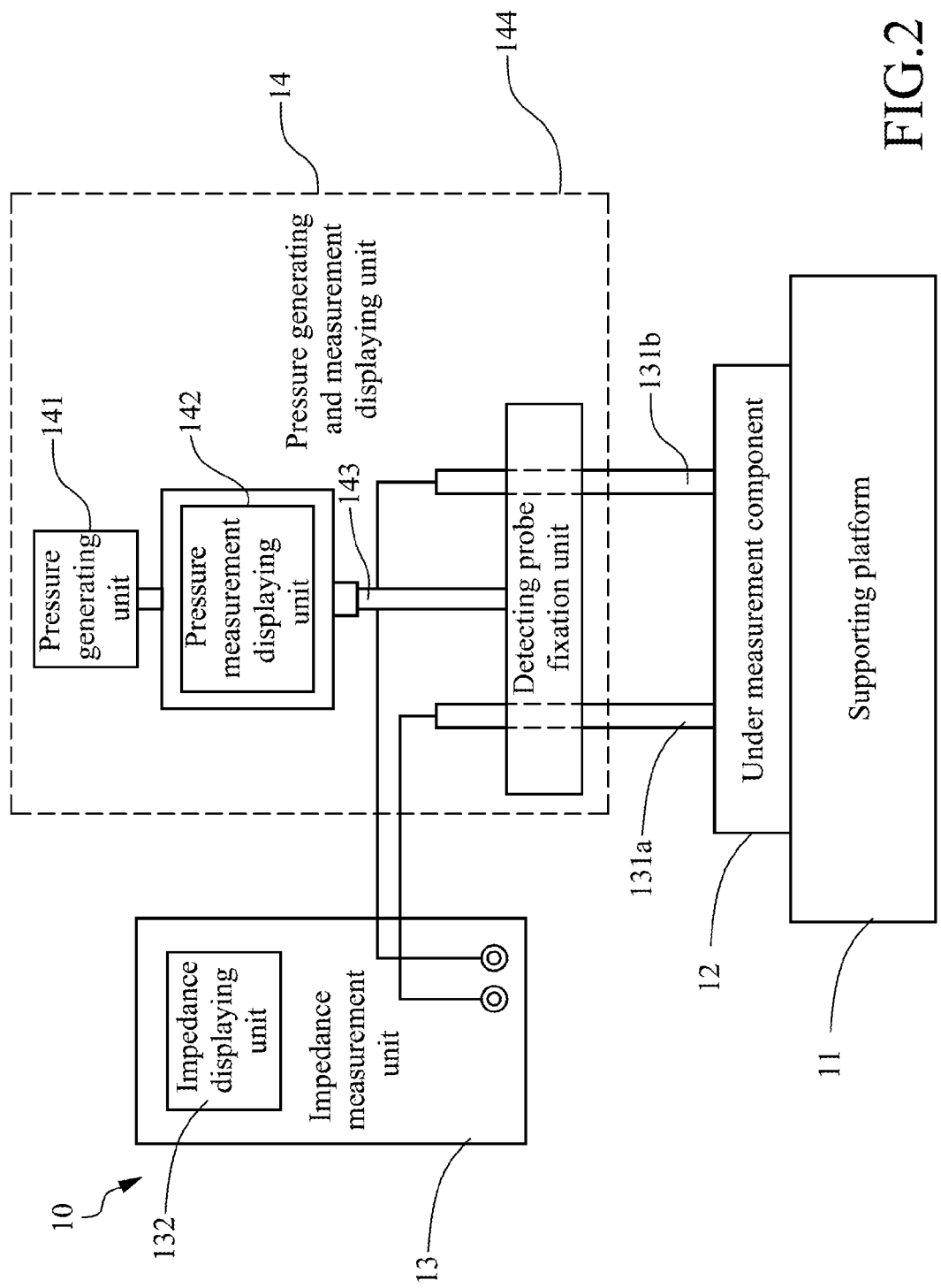
FIG. 2 is a structure scheme diagram of the measurement apparatus for determination of the optimum contact pressure among components of a solid oxide fuel cell stack in the packaging process of the present invention.

FIG. 2 is a structure scheme diagram of the measurement apparatus for determination of the optimum contact pressure among components of a solid oxide fuel cell stack in the packaging process of the present invention. As shown, the measurement apparatus for determination of the optimum contact pressure among components of a solid oxide fuel cell stack in the packaging process includes:
- a supporting platform 11, for placing under measurement component 12;
- an impedance measurement unit 13, for measuring impedance between two points, said impedance measurement unit 13 at least includes:
  - two detecting probe 131a and 131b, for contacting the positions of two measuring points to measure the impedance between said two measuring points; and
  - an impedance displaying unit 132, for displaying measured impedance between two points; and
- a pressure generating and measurement displaying unit 14, which at least includes:
  - a pressure generating unit 141, for generating pressure;
- a pressure measurement displaying unit 142, for measuring and displaying the pressure produced by pressure generating unit 141;
  - a detecting probe fixation unit 144, for fixation of said two detecting probe 131a and 131b, and for adjusting the distance between said two detecting probe 131a and 131b; and
  - a pressure transmitting unit 143, which is set between the pressure generating unit 141 and the detecting probe fixation unit 144, for transmitting pressure generated from pressure generating unit 141 to detecting probe fixation unit 144, so that, while measuring the impedance between two points on under measurement component 12, the detecting probe 131a and 131b fixed on detecting probe fixation unit 144 can apply pressure to said under measurement component 12.

Figure 1:
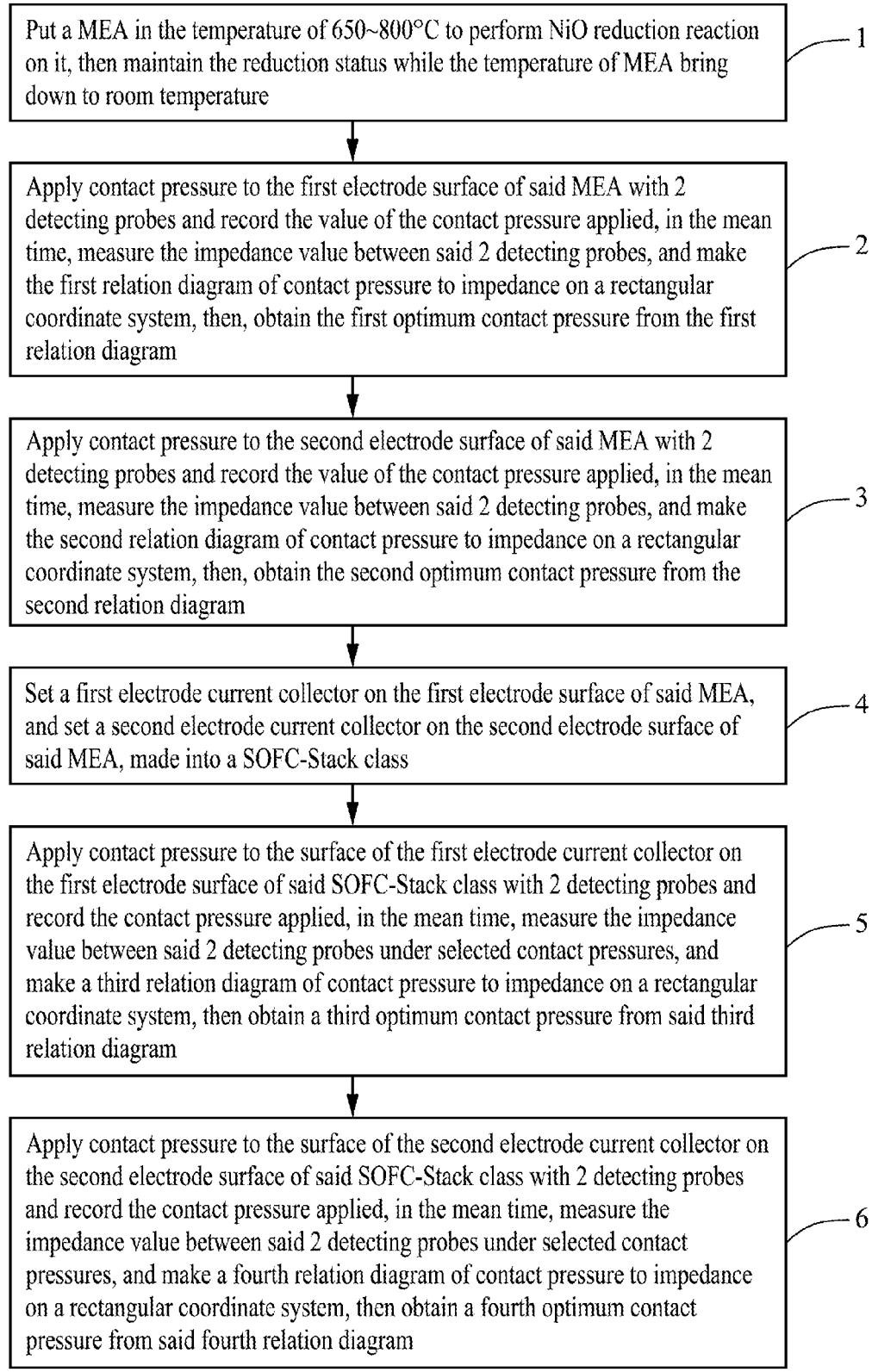
FIG. 1 is a process flow diagram of the measurement process for determination of the optimum contact pressure among components of a solid oxide fuel cell stack in the packaging process of the present invention.

Referring to FIG. 1, 2, a practical example of measuring the optimum contact pressure among components of a SOFC-Stack class in the packaging process by applying the measurement process with measurement apparatus of the present invention will be described as following:

In this example, the electrolyte of said SOFC is YSZ, anode material is NiO/YSZ, cathode material is LSM and said SOFC is anode support type.

Firstly, proceed with measurement step 1, put a MEA in the temperature of 650~800° C. to perform NiO reduction reaction on it, then, maintain the reduction status while the temperature of MEA is brought down to room temperature.

Put said MEA on the supporting platform 11 of the measurement apparatus for determination of the optimum contact pressure among components of a solid oxide fuel cell stack in the packaging process of the present invention, said MEA becomes under measurement component 12 then.

Figure 3:
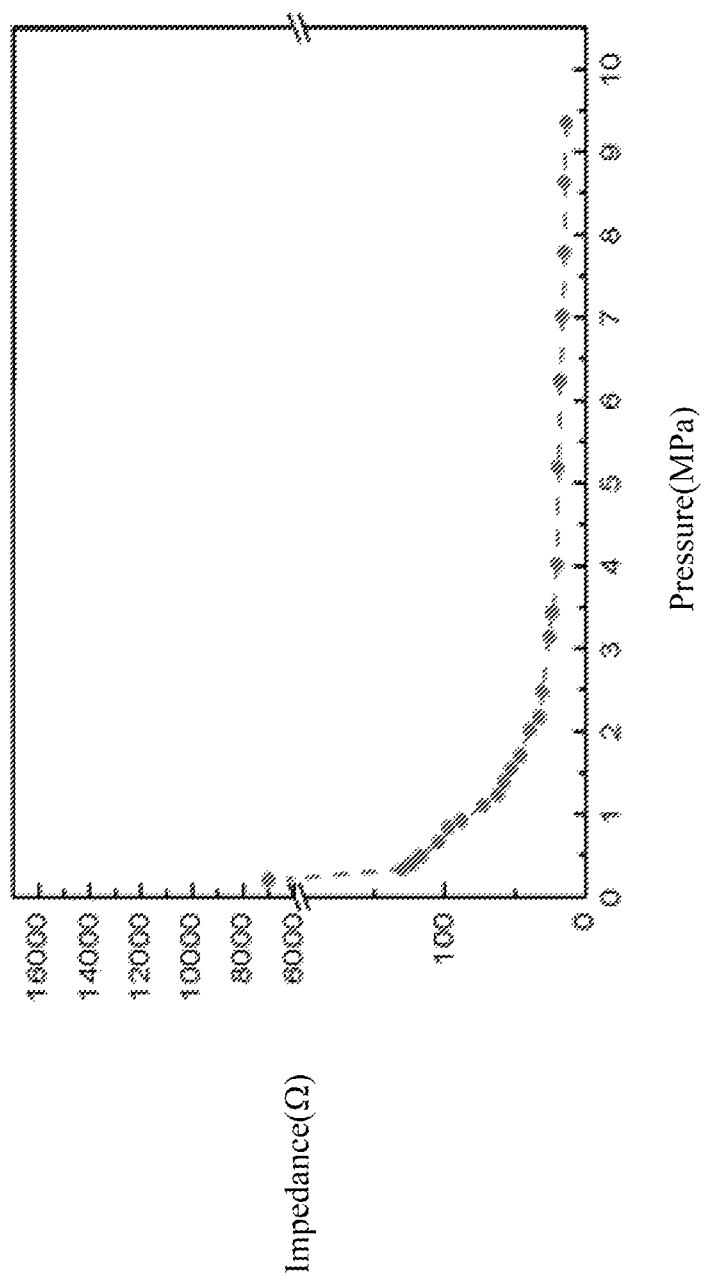
FIG. 3 is a relation diagram between MEA cathode side contact pressure and electrical impedance of the measurement process for determination of the optimum contact pressure among components of a solid oxide fuel cell stack in the packaging process of the present invention (wherein the distance between 2 impedance measuring probe pins is D=2 cm)
Figure 4:
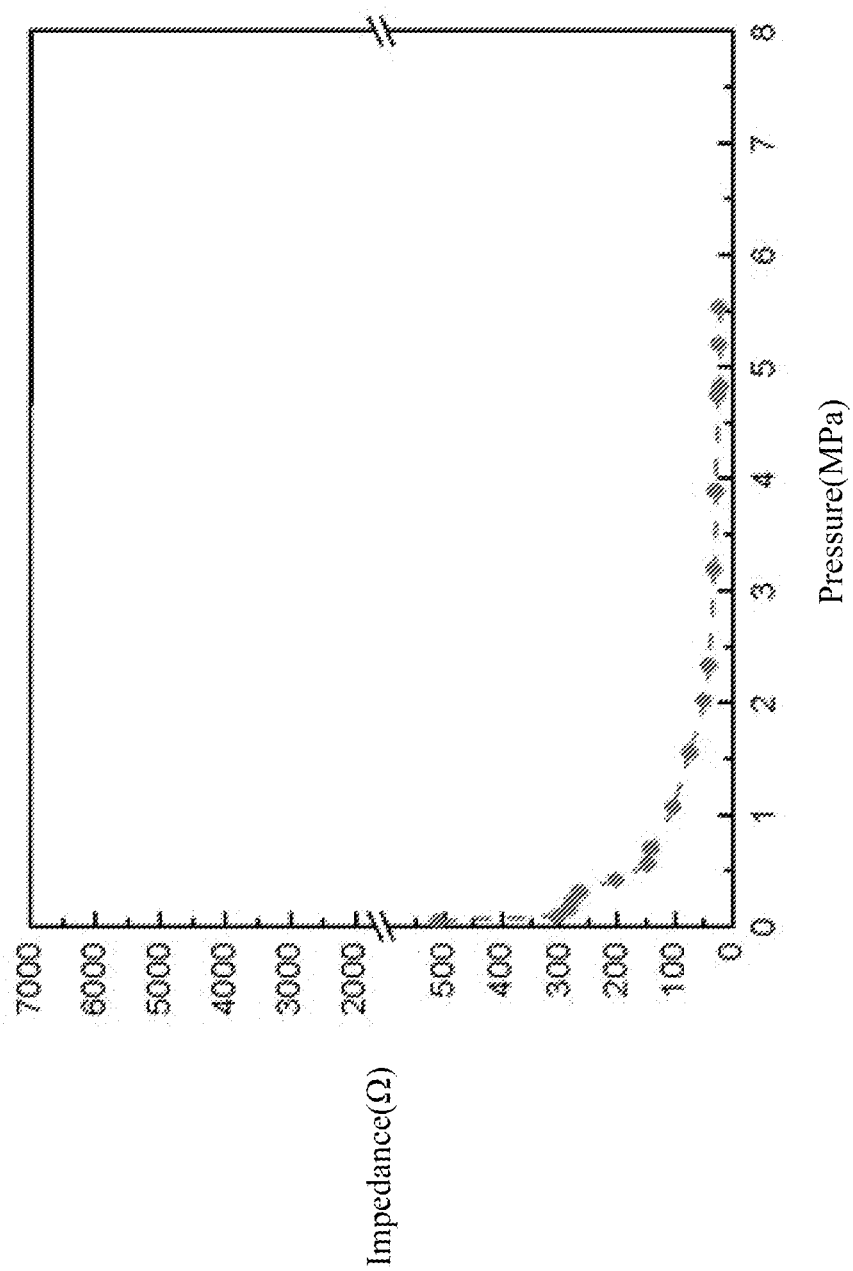
FIG. 4 is a relation diagram between MEA cathode side contact pressure and electrical impedance of the measurement process for determination of the optimum contact pressure among components of a solid oxide fuel cell stack in the packaging process of the present invention (wherein the distance between 2 impedance measuring probe pins is D=4 cm)

Next, proceed with measurement step 2, apply contact pressure (the pressure can be changed through pressure generating unit 141) to the cathode surface (the first electrode surface in this example) of said MEA with detecting probe 131a and 131b of impedance measurement unit 13 and record the value of the contact pressure applied with pressure measurement displaying unit 142, in the mean time, measure the impedance value (can be read from impedance displaying unit 132) between said 2 detecting probes as the following table 1 (there are two types of measurements, one is the measurement of distance between two detecting probes D=2 cm and the other one is distance between two probes D=4 cm), and make the first relation diagram of contact pressure to impedance on a rectangular coordinate system (there are two first relation diagrams, one is the first relation diagram wherein distance between two detecting probes D=2 cm and the first relation diagram wherein distance between two probes D=4 cm), then, obtain the first optimum contact pressure from the first relation diagram As shown in FIG. 3 and FIG. 4, the optimum contact pressure of the cathode surface of MEA (the first optimum contact pressure) is about 6.24 Mpa, the minimum impedance that can be reached is 17.62Ω.

TABLE 1 cathode

| distance between 2 detecting probes D = 2 cm | | distance between 2 detecting probes D = 4 cm | |
| --- | --- | --- | --- |
| contact pressure (Mpa) | impedance (Ω) | contact pressure (Mpa) | impedance (Ω) |
| 0.218 | 7000.0 | 0.046 | 512 |
| 0.234 | 290.0 | 0.156 | 284 |
| 0.670 | 104.1 | 0.312 | 265 |
| 1.107 | 72.50 | 0.561 | 147 |
| 2.028 | 39.40 | 1.076 | 102 |
| 3.151 | 25.50 | 2.028 | 48.0 |
| 4.024 | 19.72 | 3.198 | 30.8 |
| 6.240 | 17.62 | 4.836 | 21.0 |
| 9.360 | 13.60 | 5.538 | 22.4 |

Then proceed with measurement step 3, apply contact pressure (the pressure can be changed through pressure generating unit 141) to the anode surface (the second electrode surface in this example) of said MEA with detecting probe 131a and 131b of impedance measurement unit 13 and record the value (can be read from impedance displaying unit 132) of the contact pressure applied, in the mean time measure the impedance value between said 2 detecting probes as the following table 2 (there are two types of measurements, one is the measurement of distance between two detecting probes D=2 cm and the other one is distance between two probes D=4 cm), and make the second relation diagram of contact pressure to impedance on a rectangular coordinate system (there are two second relation diagram, one is the second relation diagram wherein distance between two detecting probes D=2 cm and the second relation diagram wherein distance between two probes D=4 cm), then obtain the second optimum contact pressure from the second relation diagram.

Figure 5:
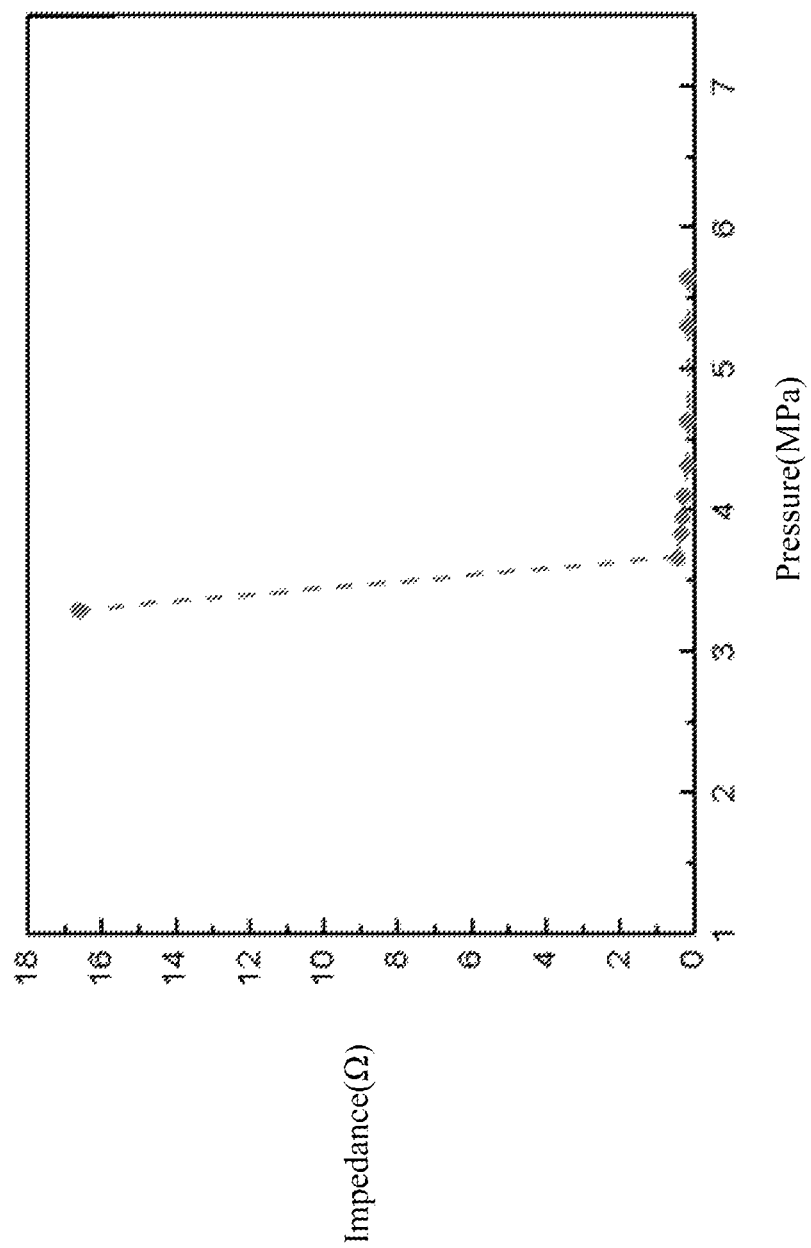
FIG. 5 is a relation diagram between MEA anode side contact pressure and electrical impedance of the measurement process for determination of the optimum contact pressure among components of a solid oxide fuel cell stack in the packaging process of the present invention (wherein the distance between 2 impedance measuring probe pins is D=2 cm)
Figure 6:
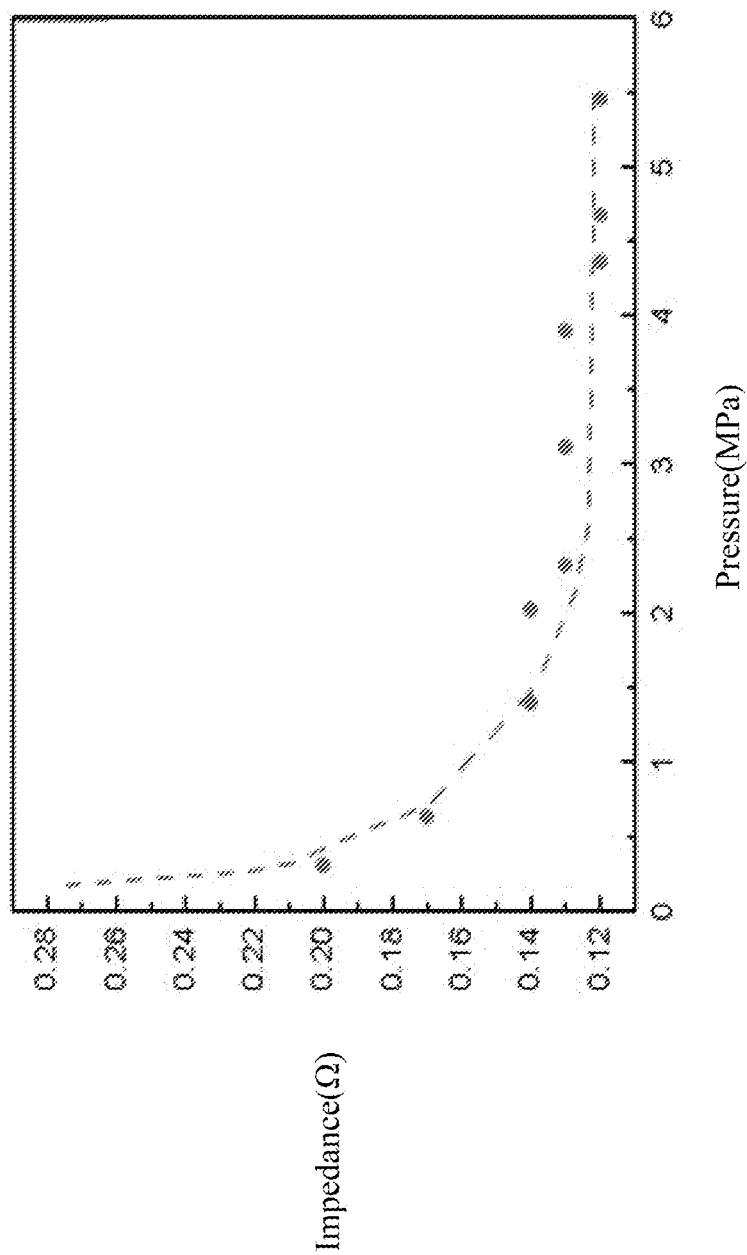
FIG. 6 is a relation diagram between MEA anode side contact pressure and electrical impedance of the measurement process for determination of the optimum contact pressure among components of a solid oxide fuel cell stack in the packaging process of the present invention (wherein the distance between 2 impedance measuring probe pins is D=4 cm)

As shown in FIG. 5 and FIG. 6, the optimum contact pressure of anode surface of MEA (the first optimum contact pressure) is about 5.30 Mpa, the minimum impedance that can be reached is 0.12-0.15Ω.

TABLE 2 anode

| distance between 2 detecting probes D = 2 cm | | distance between 2 detecting probes D = 4 cm | |
| --- | --- | --- | --- |
| contact pressure (Mpa) | impedance (Ω) | contact pressure (Mpa) | impedance (Ω) |
| 3.291 | 16.6 | 0.312 | 0.2 |
| 3.666 | 0.44 | 0.639 | 0.17 |
| 3.837 | 0.34 | 1.404 | 0.14 |
| 3.946 | 0.31 | 2.028 | 0.14 |
| 4.102 | 0.26 | 2.324 | 0.13 |
| 4.321 | 0.18 | 2.028 | 0.13 |
| 4.633 | 0.16 | 3.900 | 0.13 |
| 5.304 | 0.15 | 4.680 | 0.12 |
| 5.647 | 0.15 | 5.460 | 0.12 |

Take said MEA off from supporting platform 11, then proceed with measurement step 4, set a cathode current collector on the cathode surface of said MEA, and set an anode electrode current collector on the anode surface of said MEA, made into a SOFC-Stack class.

Put said SOFC-Stack class on the supporting platform 11 of the measurement apparatus for determination of the optimum contact pressure among components of a solid oxide fuel cell stack in the packaging process of the present invention, said SOFC-Stack class becomes under measurement component 12 then.

Figure 7:
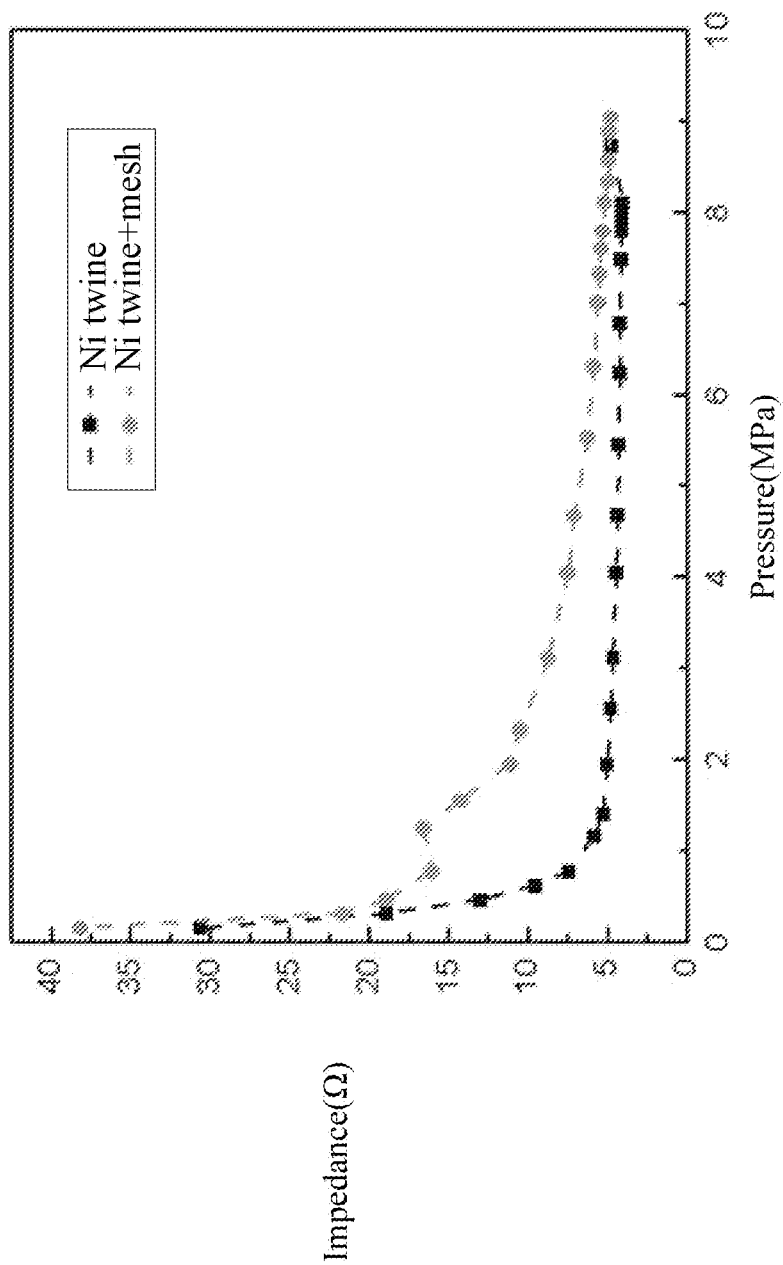
FIG. 7 is a relation diagram between SOFC-Stack class cathode side contact pressure and electrical impedance of the measurement process for determination of the optimum contact pressure among components of a solid oxide fuel cell stack in the packaging process of the present invention.

Next, proceed with measurement step 5, apply contact pressure (the pressure can be changed through pressure generating unit 141) to the cathode surface of said SOFC-Stack class with 2 detecting probes and record the value of the contact pressure applied with pressure measurement displaying unit 142, in the mean time, measure the impedance value (can be read from impedance displaying unit 132) between said 2 detecting probes as the following table 3 (there are two types of measurements, the first one is the measurement by using nickel twine as material for cathode current collector, the other one is the measurement by using nickel twine and nickel mesh as materials for cathode current collector), and make the third relation diagram of contact pressure with impedance on a rectangular coordinate system (there are two curves, as shown in FIG. 7, the third relation diagram curve is measured by using nickel twine as material for cathode current collector, and the other one third relation diagram by using nickel twine and nickel mesh as materials for cathode current collector), then obtain the third optimum contact pressure from the third relation diagram.

As shown in FIG. 7, the optimum contact pressure of cathode surface of SOFC-Stack (the third optimum contact pressure) is about 8.11~8.89 Mpa, the minimum impedance that can be reached is 4.08~4.83Ω.

TABLE 3

| cathode | | | |
|---|---|---|---|
| using nickel twine as material for cathode current collector | | using nickel twine and nickel mesh as materials for cathode current collector | |
| contact pressure (Mpa) | impedance (Ω) | contact pressure (Mpa) | impedance (Ω) |
| 0.156 | 30.60 | 0.156 | 38.14 |
| 0.312 | 18.90 | 0.312 | 21.68 |
| 0.468 | 13.01 | 0.780 | 16.01 |
| 0.624 | 9.52 | 1.560 | 14.23 |
| 1.170 | 5.83 | 1.950 | 11.12 |
| 2.574 | 4.77 | 2.340 | 10.48 |
| 3.120 | 4.65 | 3.120 | 8.72 |
| 4.056 | 4.43 | 4.056 | 7.46 |
| 5.460 | 4.28 | 5.538 | 6.25 |
| 6.240 | 4.23 | 6.318 | 5.84 |
| 7.488 | 4.14 | 7.020 | 5.60 |
| 7.800 | 4.07 | 8.112 | 5.19 |
| 7.956 | 4.08 | 8.580 | 4.93 |
| 8.112 | 4.07 | 8.892 | 4.83 |
| 8.736 | 4.75 | 9.048 | 4.77 |

Figure 8:
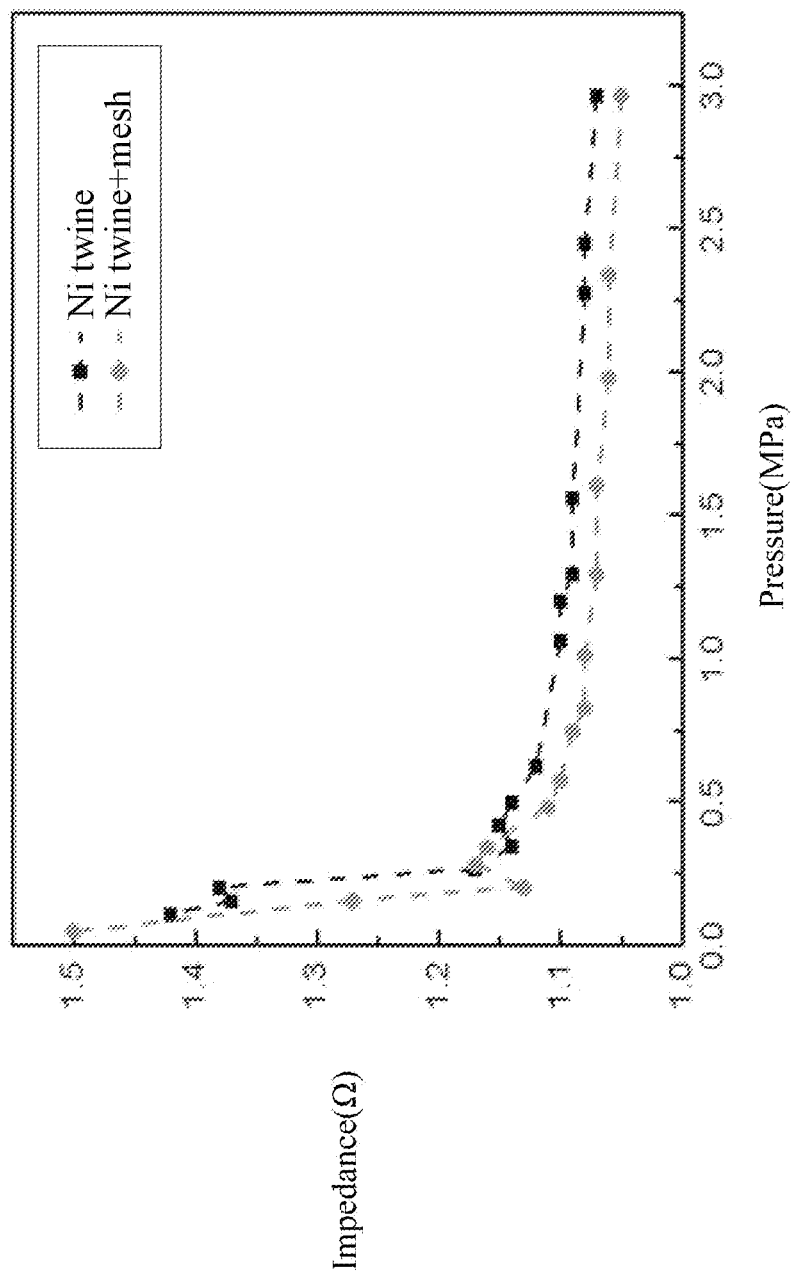
FIG. 8 is a relation diagram between SOFC-Stack class anode side contact pressure and electrical impedance of the measurement process for determination of the optimum contact pressure among components of a solid oxide fuel cell stack in the packaging process of the present invention.

Then, proceed with measurement step 6, apply contact pressure (the pressure can be changed through pressure generating unit 141) to the surface of the anode current collector on the anode surface of said SOFC-Stack class with 2 detecting probes 131a and 131b of the measurement apparatus and record the value of the contact pressure applied with the pressure measurement displaying unit 142, in the mean time measure the impedance value (can be read from impedance displaying unit 132) between said 2 detecting probes as the following table 4, (there are two types of measurements in table 4, one is the measurement by using nickel twine as material for anode current collector, the other one is the measurement by using nickel twine and nickel mesh as materials for anode current collector), and make the fourth relation diagram of contact pressure with impedance on a rectangular coordinate system (there are two curves, as shown in FIG. 8, one is the fourth relation diagram curve by using nickel twine as material for anode current collector, and the other one fourth relation diagram by using nickel twine and nickel mesh as materials for anode current collector), then, obtain the fourth optimum contact pressure from the fourth relation diagram.

As shown in FIG. 8, the optimum contact pressure of anode surface of SOFC-Stack (the fourth optimum contact pressure) is about 1.01-1.20 Mpa, the minimum impedance that can be reached is 1.08Ω.

TABLE 4

| anode | | | |
|---|---|---|---|
| using nickel twine as material for anode current collector | | using nickel twine and nickel mesh as materials for anode current collector | |
| contact pressure (Mpa) | impedance (Ω) | contact pressure (Mpa) | impedance (Ω) |
| 0.11 | 1.42 | 0.05 | 1.5 |
| 0.156 | 1.37 | 0.155 | 1.27 |
| 0.202 | 1.38 | 0.205 | 1.13 |
| 0.265 | 1.17 | 0.285 | 1.17 |
| 0.343 | 1.14 | 0.345 | 1.16 |

TABLE 4-continued

| anode | | | |
|---|---|---|---|
| using nickel twine as material for anode current collector | | using nickel twine and nickel mesh as materials for anode current collector | |
| contact pressure (Mpa) | impedance (Ω) | contact pressure (Mpa) | impedance (Ω) |
| 0.421 | 1.15 | 0.48 | 1.11 |
| 0.499 | 1.14 | 0.57 | 1.1 |
| 0.624 | 1.12 | 0.74 | 1.09 |
| 1.060 | 1.1 | 0.82 | 1.08 |
| 1.201 | 1.1 | 1.01 | 1.08 |
| 1.294 | 1.09 | 1.29 | 1.07 |
| 1.560 | 1.09 | 1.60 | 1.07 |
| 2.277 | 1.08 | 1.98 | 1.06 |
| 2.449 | 1.08 | 2.34 | 1.06 |
| 2.964 | 1.07 | 2.96 | 1.05 |

In addition, said impedance measurement unit 13 may be a multi-meters with a rotary measurement switch for voltage/resistance (impedance)/current of the electrical properties.

Above mentioned materials applied to SOFC are for examples in describing the embodiments of the present invention, the application of the present invention is not limited to above mentioned materials.

Therefore, by applying the measurement process for determination of the optimum contact pressure among components of a solid oxide fuel cell stack in the packaging process and its measurement apparatus of the present invention, the optimum contact pressure among components in the packaging process for SOFC-Stack class can be obtained, so that the loss caused by packaging SOFC-Stack class can be reduced, in the mean time, optimum electrical contact among components can be reached.

Although the preferred embodiments have been described as above, the application of the present invention is not limited to that, any artisan familiar with the pertaining art may make some change or amend it within the scope of the present invention, therefore, the scope of protection shall be based on the claims of the present invention.

What is claimed is:

1. A measurement process for determination of the optimum contact pressure among components of a solid oxide fuel cell, SOFC stack in the packaging process, comprising the following measurement process steps:

Step 1: Put a membrane electrode assembly, MEA in the temperature of 650-800° C. to perform NiO reduction reaction on it, then maintain the reduction status while the temperature of MEA bring down to room temperature;

Step 2: Apply contact pressure to the first electrode surface of said MEA with 2 detecting probes and record the value of the contact pressure applied, in the mean time, measure the impedance value between said 2 detecting probes, and make the first relation diagram of contact pressure to impedance on a rectangular coordinate system, then, obtain the first optimum contact pressure from the first relation diagram;

Step 3: Apply contact pressure to the second electrode surface of said MEA with 2 detecting probes and record the value of the contact pressure applied, in the mean time, measure the impedance value between said 2 detecting probes, and make the second relation diagram of contact pressure to impedance on a rectangular coordinate system, then, obtain the second optimum contact pressure from the second relation diagram.

2. A measurement process for determination of the optimum contact pressure among components of a solid oxide fuel cell stack in the packaging process, as recited in claim 1 wherein said measurement process steps further comprise:

Step 4: Set a first electrode current collector on the first electrode surface of said MEA, and set a second electrode current collector on the second electrode surface of said MEA, made into a SOFC-Stack class;

Step 5: Apply contact pressure to the surface of the first electrode current collector on the first electrode surface of said SOFC-Stack class with 2 detecting probes and record the contact pressure applied, in the mean time, measure the impedance value between said 2 detecting probes under selected contact pressures, and make a third relation diagram of contact pressure to impedance on a rectangular coordinate system, then obtain a third optimum contact pressure from said third relation diagram; and Step 6: Apply contact pressure to the surface of the second electrode current collector on the second electrode surface of said SOFC-Stack class with 2 detecting probes and record the contact pressure applied, in the mean time, measure the impedance value between said 2 detecting probes under selected contact pressures, and make a fourth relation diagram of contact pressure to impedance on a rectangular coordinate system, then obtain a fourth optimum contact pressure from said fourth relation diagram.

3. A measurement apparatus for determination of the optimum contact pressure among components of a solid oxide fuel cell stack in the packaging process, comprising the followings:

a supporting platform, for placing under measurement component;

an impedance measurement unit, for measuring impedance between two points, said impedance measurement unit at least includes:

two detecting probes, for contacting the positions of two measuring points to measure the impedance between said two measuring points; and an impedance displaying unit, for displaying measured impedance between two points; and a pressure generating and measurement displaying unit, which at least includes:

a pressure generating unit, for generating pressure;

a pressure measurement displaying unit, for measuring and displaying the pressure produced by pressure generating unit;

a detecting probe fixation unit, for fixation of said two detecting probes, and for adjusting the distance between said two detecting probes; and a pressure transmitting unit, which is set between the pressure generating unit and the detecting probe fixation unit, for transmitting pressure generated from pressure generating unit to detecting probe fixation unit, so that, while measuring the impedance between two points on under measurement component, the detecting probes fixed on detecting probe fixation unit can apply pressure to said under measurement component.

4. A measurement apparatus for determination of the optimum contact pressure among components of a solid oxide fuel cell stack in the packaging process, as recited in claim 3 wherein said impedance measurement unit is a multi-meters with rotary measurement switch for voltage/resistance (impedance)/current of the electrical properties.

\* \* \* \* \*